United States Patent
Klein

(10) Patent No.: US 8,425,117 B2
(45) Date of Patent: Apr. 23, 2013

(54) SUPPORTING TRACK ELEMENT FOR LINEAR BALL BEARING AND METHOD FOR PRODUCING THE SUPPORTING TRACK ELEMENT

(75) Inventor: Udo Klein, Adenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 688 days.

(21) Appl. No.: 12/608,247

(22) Filed: Oct. 29, 2009

(65) Prior Publication Data

US 2010/0111456 A1    May 6, 2010

(30) Foreign Application Priority Data

Oct. 30, 2008    (DE) .................. 10 2008 053 901

(51) Int. Cl.
 *F16C 29/06*    (2006.01)
(52) U.S. Cl.
 USPC ............................................................. 384/43
(58) Field of Classification Search .................... 384/43, 384/44, 45, 49, 50, 51; 29/898.03, 898.057, 29/898.066; 73/414
 See application file for complete search history.

(56) References Cited

U.S. PATENT DOCUMENTS

| 3,545,826 A | | 12/1970 | Magee | |
| 3,876,264 A | * | 4/1975 | McCloskey | 384/43 |
| 3,893,732 A | * | 7/1975 | McCloskey | 384/43 |
| 5,558,442 A | | 9/1996 | Ng | |
| 5,613,780 A | * | 3/1997 | Ng | 384/43 |
| 5,829,882 A | * | 11/1998 | Ng et al. | 384/43 |
| 2008/0107365 A1 | * | 5/2008 | Mueller | 384/44 |

FOREIGN PATENT DOCUMENTS

WO    03097284 A1    11/2003

* cited by examiner

Primary Examiner — Phillip A Johnson
(74) Attorney, Agent, or Firm — Lucas & Mercanti, LLP

(57) ABSTRACT

A supporting track element for use in a linear ball bearing, with at least one outer surface which is outwardly curved in one direction, at least in some regions, and at least one track which is opposite the outer surface and is intended for at least partially receiving load-bearing balls of a linear ball bearing. In addition, the supporting track element in cross-section has at least one material interruption which forms two adjacent cross-sectional regions. The adjacent cross-sectional regions touch at least in the region of the outer surface. As a result, the supporting track element is produced cost-effectively without significant limitations to the functionality thereof occurring. A method for producing a supporting track element is also proposed. Furthermore, a linear ball bearing is equipped with supporting track elements.

8 Claims, 9 Drawing Sheets

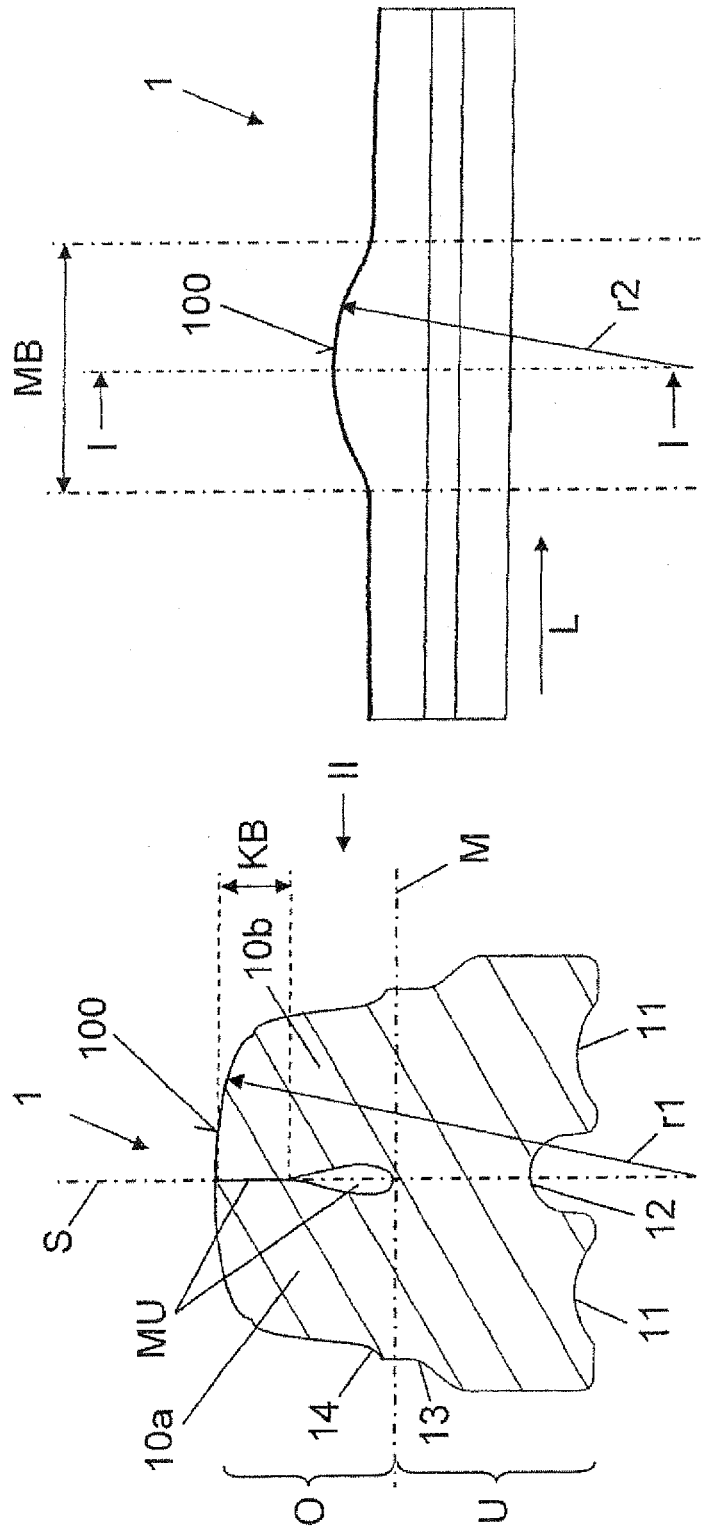

SUPPORTING TRACK ELEMENT FOR LINEAR BALL BEARING AND METHOD FOR PRODUCING THE SUPPORTING TRACK ELEMENT

This application claims the priority of DE 10 2008 053 901.5 filed Oct. 30, 2008, which is incorporated by reference herein.

FIELD OF THE INVENTION

The invention relates to a supporting track element for use in a linear ball bearing, with at least one outer surface which is outwardly curved in one direction at least in some regions and at least one track which is opposite the at least one outer surface and is intended for at least partially receiving load-bearing balls of a linear ball bearing.

BACKGROUND OF THE INVENTION

Supporting track elements of this type are used in linear ball bearings. Linear ball bearings are known for the mounting of machine parts which are movable to and fro. Examples thereof may include a driving spindle and a bearing housing of a machine tool. The linear ball bearings have the task of ensuring friction-free mounting in the direction of movement. In order at least to ensure a satisfactory function even in the event of relatively small alignment errors occurring between the parts moving in relation to one another, the supporting track elements of the linear ball bearings have at least one radial outer surface which is outwardly curved at least in one direction (convexity) for contact with an inner surface of the part surrounding the guide rail. As a result, the supporting track elements can move in a tilting manner on the contact surface of the part surrounding the guide rail and alignment errors can be largely compensated for by said construction.

The production of the abovementioned convexity of the supporting track elements is comparatively costly. The convexity is generally produced by bending the supporting track elements in the desired direction. Due to the bending which has taken place, the supporting track element tracks lying opposite the convex outer surface still have to be ground in order to obtain the desired track quality. Sometimes, a further hardening of the supporting track elements is also provided.

The invention also relates to a linear ball bearing for the longitudinally displaceable mounting of a shaft-like guide rail in a part surrounding the guide rail, with a sleeve-like cage which has recesses which are arranged one behind another in the circumferential direction and in which recirculating ball tracks are held, wherein each recirculating ball track has at least one supporting section with load-bearing balls supported rollably on the guide rail, and wherein the load-bearing balls of a recirculating ball track are additionally supported rollably on a track of a supporting track element which is inserted indirectly or directly into the cage and has at least one radial outer surface which is outwardly curved at least in one direction and is intended for contact with an inner surface of the part surrounding the guide rail.

WO 01/11251 A1 (DE 199 37 278 A1) discloses a linear ball bearing. The latter has supporting track elements of the type in question which have an outer surface which is outwardly curved in two directions, and can therefore roll very readily in a pivotable manner on the bore inner surface of a machine housing surrounding the linear ball bearing. In addition, the supporting track elements are held in housing-like receiving parts which, for their part, are arranged such that they can be inserted in the radial direction into and removed from recesses in a sleeve-like cage.

DE 39 10 469 A1 describes a linear ball bearing in which supporting track elements are likewise inserted into recesses in a cage. The outer surface of the supporting track elements which is intended for rocking contact with an inner circumferential surface of a bearing housing bore receiving the cage descends radially inwards with respect to the cage axis from a central region, which is positioned in the region of the rocking axis of said outer surface, towards the ends of the supporting track elements.

DE 1 949 182 A1 also discloses a linear ball bearing in which use is made of supporting track elements which are beveled in their longitudinal direction from the center toward the ends and are inserted into recesses in a cage. The central part of the supporting track elements forms an axis of rotation and therefore permits a tilting movement, as a result of which angle errors between the parts moving in relation to one another can be compensated for.

DE 199 54 387 A1 likewise describes a linear ball bearing for the mounting of a shaft with supporting track elements, the radial outer surfaces of which are of curved design such that the supporting track elements can be adjusted by tilting to dimensional tolerances of the shaft.

Finally, mention should also be made of U.S. Pat. No. 5,558,442 which describes a linear ball bearing with supporting track elements which, in their central region, as seen in their longitudinal extent, have a radial outer surface which is curved in its longitudinal direction, the curvature extending over the entire width of the supporting track elements.

OBJECT OF THE INVENTION

The invention is based on the object of presenting a supporting track element which can be produced cost-effectively and compensates for alignment errors in the linear guide. Furthermore, the intention is to propose a linear ball bearing which is cost-effective, has a sufficient load-bearing capacity and can sufficiently compensate for alignment errors of the components moving in relation to one another. Furthermore, the intention is to present a method for producing the supporting track element.

SUMMARY OF THE INVENTION

The invention is based on the finding that the outer surface of the supporting track elements can be reduced without significant losses in the load-bearing capacity thereof and that therefore simplifications and advantages in terms of costs during the production can be obtained.

The invention is therefore first of all based on a supporting track element for use in a linear ball bearing, with at least one outer surface which is outwardly curved in one direction at least in some regions, and at least one track which is opposite the at least one outer surface and is intended for at least partially receiving load-bearing balls of a linear ball bearing.

In addition, it is provided according to the invention that the supporting track element in cross section has at least one material interruption by means of which two adjacent cross-sectional regions are formed, the adjacent cross-sectional regions touching at least in some regions at least in the region of the at least one curved outer surface.

As a result, it is possible to produce the required convexity or curvature of the outer surface of the supporting track elements with a simplified production method (for example by means of deformation) without significant losses in the load-bearing capacity of the supporting track elements occurring.

The material interruption in the cross section of the supporting track element reduces the quantity of material to be deformed and therefore also the deformation forces necessary for this purpose. This has the result that, during the deformation, the supporting track element tracks opposite the convex outer surface are not damaged and a grinding operation on said tracks, which is normally necessary to obtain the desired track quality, can be omitted.

According to a first advantageous development of the inventive concept, it is provided that the material interruption is arranged in the region of a cross-sectional line of symmetry of the supporting track element. This ensures a uniform distribution of load or absorption of load by the supporting track element.

According to a second advantageous development, it is provided that the adjacent cross-sectional regions touch in a central region of a longitudinal extent of the supporting track element. This permits optimum adaptability of the supporting track element in the event of alignment inaccuracies.

A further expedient development of the invention makes provision for the supporting track element to be provided along its longitudinal sides with at least one material clearance, the material clearances being arranged approximately level with the material interruption. Each material clearance leads to a cross-sectional tapering, which ultimately contributes to simplified producibility of the supporting track element. In this case, it is also entirely advantageous if the supporting track element has at least one further material clearance along its longitudinal sides.

Furthermore, it is expedient if the supporting track element has a lower half and an upper half in cross section, and the material interruption is located substantially in the region of the upper half of the supporting track element. This permits a well balanced ratio between sufficient stability in the region of the tracks and simplified producibility of the supporting track element.

The invention furthermore relates to a linear ball bearing for the longitudinally displaceable mounting of a shaft-like guide rail in a part surrounding the guide rail, with a sleeve-like cage which has recesses which are arranged one behind another in the circumferential direction and in which recirculating ball tracks are held, wherein each recirculating ball track has at least one supporting section with load-bearing balls supported rollably on the guide rail, and wherein the load-bearing balls of a recirculating ball track are additionally supported rollably on a track of a supporting track element which is inserted indirectly or directly into the cage and has at least one radial outer surface which is outwardly curved at least in one direction and is intended for contact with an inner surface of the part surrounding the guide rail. According to the invention, it is provided in this case that at least one supporting track element, preferably each supporting track element of the linear ball bearing, is designed as a supporting track element according to the invention having the previously described features. This contributes to the linear ball bearing being able to be produced cost-effectively, having a sufficient load-bearing capacity and being able to sufficiently compensate for alignment errors of the components moving in relation to one another.

The invention finally also relates to a method for producing a supporting track element with the abovementioned features, according to the following method steps:
producing a supporting track element blank, preferably as an extruded profile, which has at least one slot-like material interruption which extends in the longitudinal direction of the blank and as a result of which two adjacent cross-sectional regions having an outer surface are formed, and which lies opposite a side of the supporting track element blank, which side has tracks,
acting upon the supporting track element blank at least in some regions with horizontal deformation forces in such a manner that the adjacent cross-sectional regions touch at least in some regions,
simultaneously or subsequently acting upon the supporting track element blank at least in some regions with vertical deformation forces in such a manner that the outer surface of the supporting track element blank assumes a contour which corresponds to the supporting track element.

This production method can be carried out very cost-effectively with comparatively low deformation forces. By reducing the deformation forces required in comparison to the previous methods of producing supporting track elements of the type in question, there is no risk that the supporting track element side in which the tracks for the load-bearing balls are placed will be deformed upon formation of the convexity located opposite, which would result in the supporting track element being unusable or requiring finishing work (regrinding).

BRIEF DESCRIPTION OF THE DRAWINGS

The invention is explained in more detail below using a preferred exemplary embodiment and with reference to the attached drawing, in which FIG. 1 shows a cross-sectional illustration of a supporting track element according to the invention according to a sectional profile I-I from FIG. 2;

FIG. 2 shows an illustration of the supporting track element according to view II from FIG. 1, but not to scale;

DETAILED DESCRIPTION OF THE DRAWINGS

Figures 3, 4:
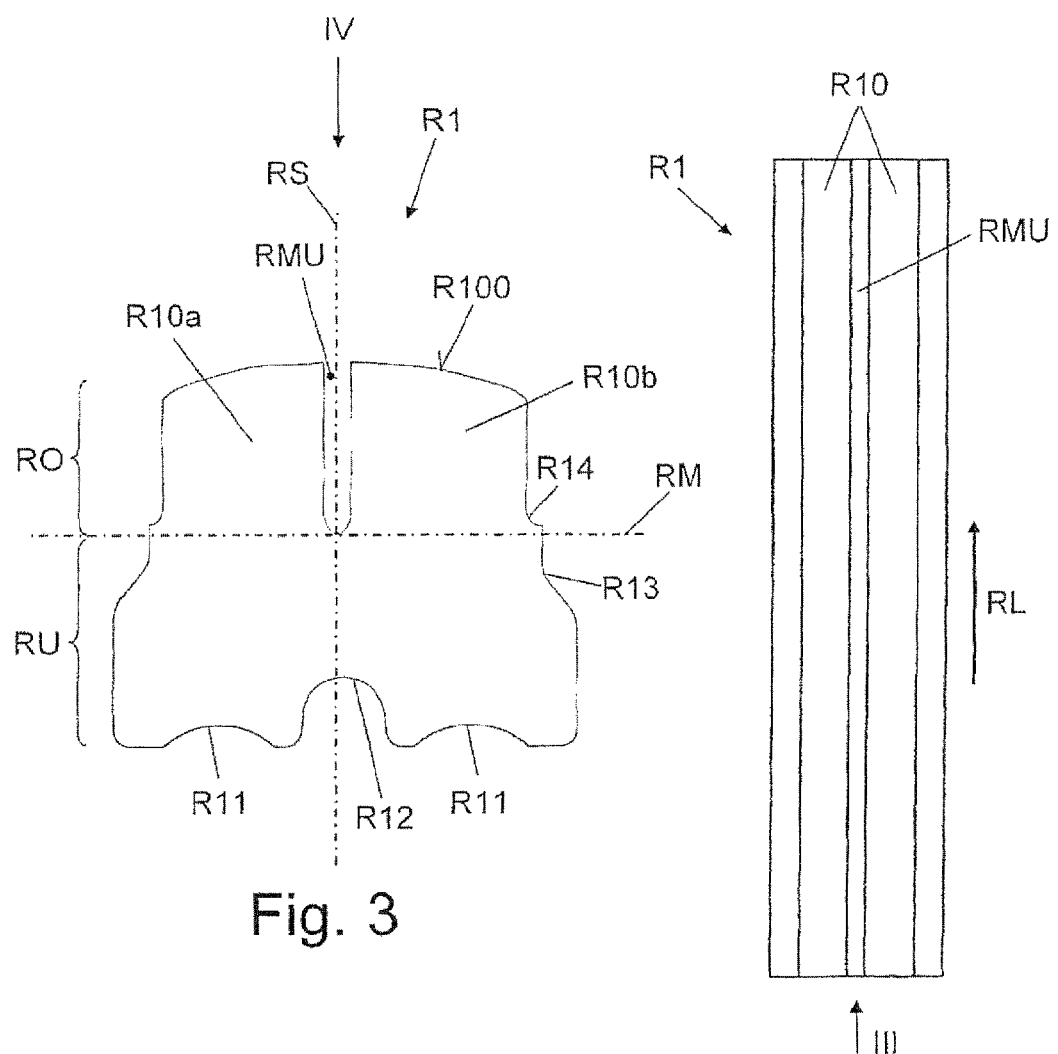
FIG. 3 shows an end side view of a blank of the supporting track element according to the invention before deformation and according to the view III from FIG. 4.
FIG. 4 shows a schematic top view of the blank of the supporting track element according to view IV of FIG. 3, but not to scale.

At first, reference is made to FIGS. 1 and 2. They illustrate an exemplary embodiment of a supporting track element 1 according to the invention in two views. The supporting track element 1 has the form of an elongate block with a longitudinal extent L, and has a lower half U and an upper half O, as seen in cross section. The upper half O has an outwardly curved surface 100, said surface 100 being outwardly curved both in the transverse direction (r1) and in the longitudinal direction (r2) of the supporting track element 1. Furthermore, a vertical cross-sectional line of symmetry S, which divides the cross section of the supporting track element 1 into two equal halves, can be seen. A cross-sectional centerline M divides the cross section of the supporting track element 1 into the lower half U and the upper half O.

A material interruption MU, which extends from the surface 100 approximately as far as the cross-sectional centerline M and is positioned approximately on the cross-sectional line of symmetry S of the supporting track element 1, can be seen level with the upper half O. The material interruption MU divides the upper half O of the supporting track element 1 into two adjacent cross-sectional regions 10a and 10b. Furthermore, FIG. 1 shows that the cross-sectional regions 10a, 10b touch in some regions in a contact region KB. In this case, the contact region KB extends from the surface 100 in the direction of the lower half U and, seen in cross section, has approximately half of the longitudinal extent of the material interruption MU.

It is readily apparent from FIG. 2 how the surface 100 extends in the longitudinal direction L of the supporting track element 1. A curvature r2 of the surface 100 thus also runs in the longitudinal direction L, specifically substantially only in a central region MB of the supporting track element 1. Contact (KB) between the adjacent cross-sectional regions 10 also occurs in this region.

FIG. 1 furthermore shows that the supporting track element 1 is provided along its longitudinal sides with material clearances 13 and 14. The material clearances 13 are arranged in the region of the lower half U and the material clearances 14 are arranged in the region of the upper half O. Overall, the lower half U has a greater width than the upper half O.

The lower side of the supporting track element 1 has two tracks 11 for partially receiving load-bearing balls of a recirculating ball track, the tracks 11 being spaced apart from each other by a groove-like depression 12.

FIGS. 3 and 4 show a blank R1 of the supporting track element 1 in two views. The term "blank" here means the state of the supporting track element 1 prior to a method step for deforming the upper side thereof.

FIG. 3 shows the supporting track element blank R1 in an end side view in which a cross-sectional line of symmetry RS and a cross-sectional centerline RM are again shown, and the centerline RM divides the cross section of the supporting track element blank R1 into a lower half RU and an upper half RO. The supporting track element blank R1 has a surface R100 which is curved outwards only in the transverse direction thereof, i.e. over the width thereof, but not in the direction of a longitudinal extent RL of the supporting track element blank R1.

Starting from said surface 8100, specifically in the region of the cross-sectional line of symmetry RS, there is a slot-like material interruption RMU which extends approximately as far as the cross-sectional centerline RM. Two adjacent cross-sectional regions R10a and R10b are formed by said slot-like material interruption RMU.

Furthermore, the longitudinal sides of the supporting track element blank R1 are provided with material clearances R13 and R14, the material clearances R13 being located in the region of the lower half RU and the material clearances R14 being located in the region of the upper half RO. Overall, as a result, the cross section of the supporting track element blank R1 is wider in the region of the lower half RU than in the region of the upper half RO.

Furthermore, tracks R11, which are spaced apart from each other by means of a groove-like depression R12, can be seen on the lower side of the supporting track element blank R1. The quality of the tracks 11 is not impaired by a deformation (described in more detail below) of the supporting track element blank R1, and therefore remachining of the tracks R11 after the deformation (for example by grinding) can be omitted.

Figure 5:
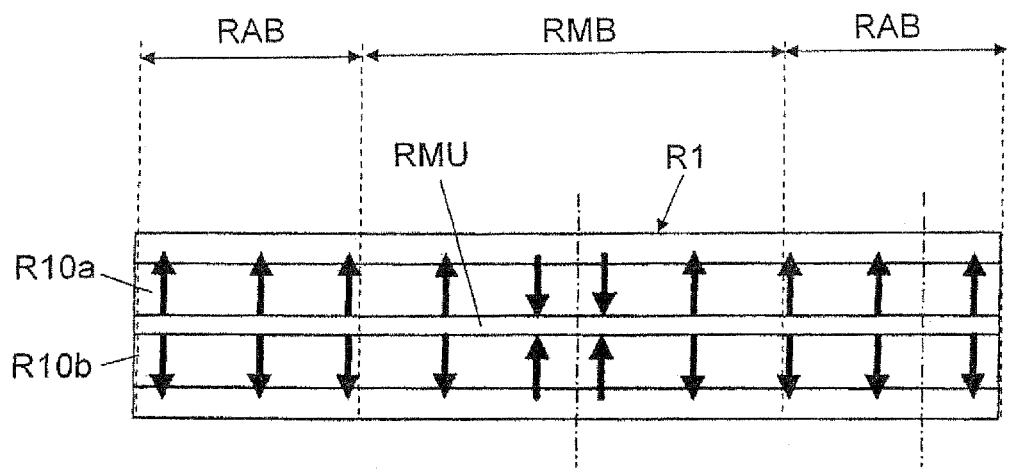
FIG. 5 shows a schematic top view of the blank of the supporting track element with a schematic indication of the horizontal deformation forces acting on the blank.
Figure 6:
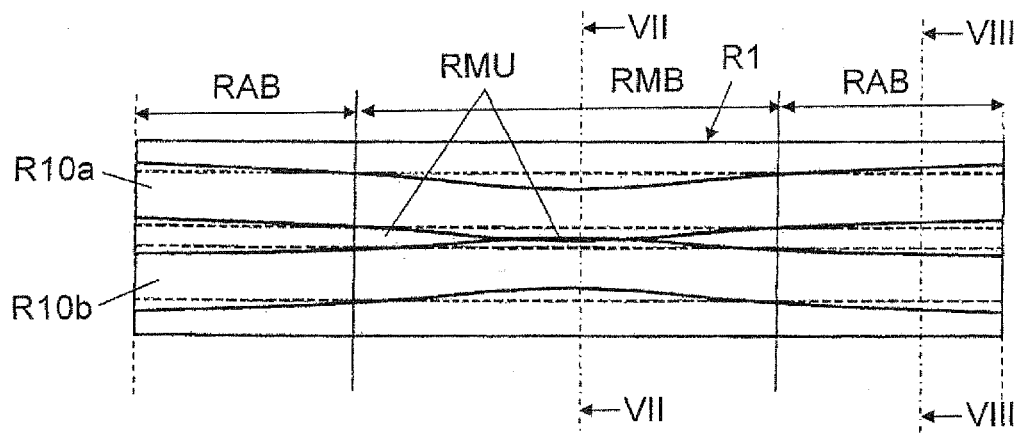
FIG. 6 shows a schematic illustration of the blank of the supporting track element according to FIG. 5 after deformation has taken place.

FIGS. 5 and 6 illustrate the supporting track element blank R1 from above, wherein the supporting track element blank R1 can be divided in the direction of a longitudinal extent RL into a central region RMB and two outer regions RAB. Furthermore, the deformation forces which act on the supporting track element blank R1 during a deformation are indicated by arrows. The adjacent cross-sectional regions R10a and R10b are thus substantially pressed together in the central region RMB until they touch at least in some regions. By contrast, in the axially outer regions RAB, the adjacent cross-sectional regions R10a, R10b are moved somewhat outwards by the deformation. The positions of the adjacent cross-sectional regions R10a, R10b prior to the deformation are indicated by the dashed lines.

Figure 7:
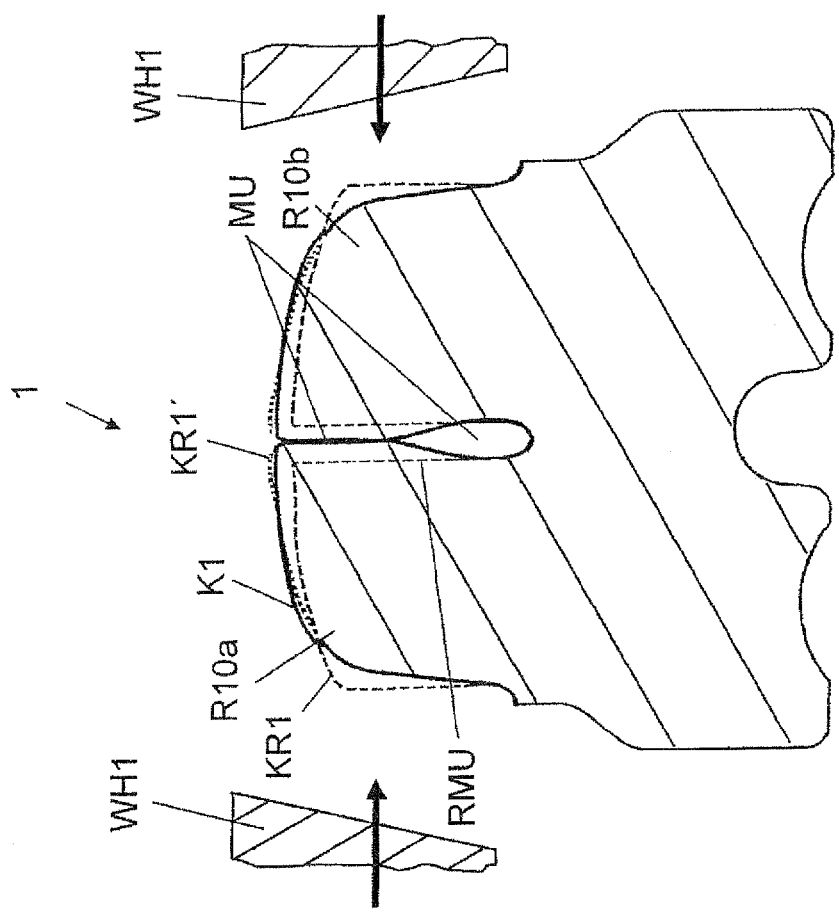
FIG. 7 shows an illustration of the deformation steps carried out from the blank to the finished supporting track element, specifically in the central region of the supporting track element according to the sectional profile VII-VII in FIG. 6.
Figure 8:
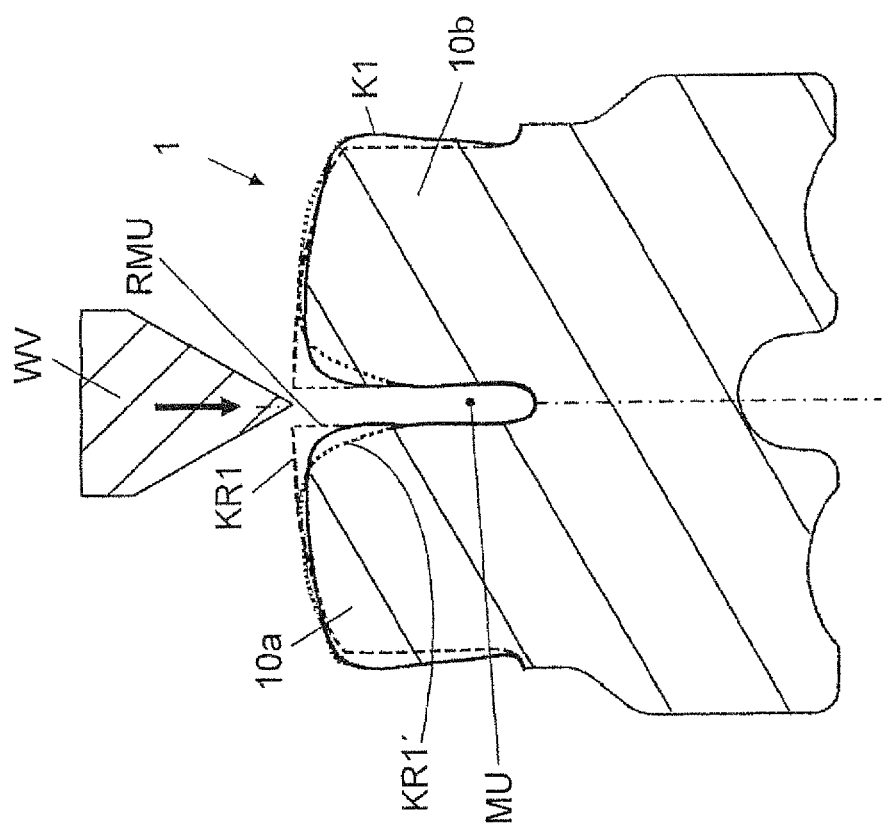
FIG. 8 shows an illustration of the deformation steps carried out from the blank to the finished supporting track element, specifically in the outer regions of the supporting track element according to the sectional profile VII-VII in FIG. 6.

FIGS. 7 and 8 schematically show the cross-sectional contours of the supporting track element blank R1 and of the supporting track element 1, respectively, prior to, during and after deformation has taken place. In this case, the contour line KR1 corresponds to the contour of the supporting track element blank R1 prior to deformation, the contour line KR1' corresponds to the contour of the supporting track element blank R1 after a first deformation by means of substantially horizontal deformation forces, and the contour line K1 corresponds to the contour of the finished deformed supporting track element 1. FIG. 7 shows the respective cross-sectional contours in the central region, and FIG. 8 shows them in the outer regions. respectively. Furthermore, the tools WH1 and WV used during the deformation are respectively illustrated schematically.

It is apparent that, during the machining (deformation) of the supporting track element blank R1, the adjacent cross-sectional regions R10a, R10b are pressed together by means of horizontal deformation forces until said cross-sectional regions touch each other in said contact region KB (see also FIG. 1). It is apparent from FIG. 7 that, after the horizontal deformation forces are applied, the contour KR1' still protrudes somewhat over the finished contour K1 (desired size).

It can be seen from FIG. 8 that the contour line KR1' first of all corresponds in the outer regions to a widening of the material interruption RMU of the supporting track element blank R1. In a further machining step, substantially vertical deformation forces are applied in order to press the contour line KR1' in the central region downwards onto the contour line K1 of the finished supporting track element 1. In order, in the process, to avoid too severe a pressing together of the adjacent cross-sectional regions 10a, 10b in the outer regions, in the outer regions a wedge-shaped tool WV is additionally partially introduced into the material interruption RMU (compare FIG. 8), it also being possible for the tools WH1 and WV to be connected to each other as a single piece.

During the deformation of the supporting track element blank R1, two basic operations, namely piling up and displacement of material and application of horizontal and vertical deformation forces, are therefore carried out. It should be mentioned here that said basic operations can be carried out successively or else simultaneously (depending on the design of the deformation tool). The dimensioning of the slot-like material interruption RMU of the supporting track element blank R1 should be such that overall as little a degree of deformation as possible is necessary.

Figure 9:
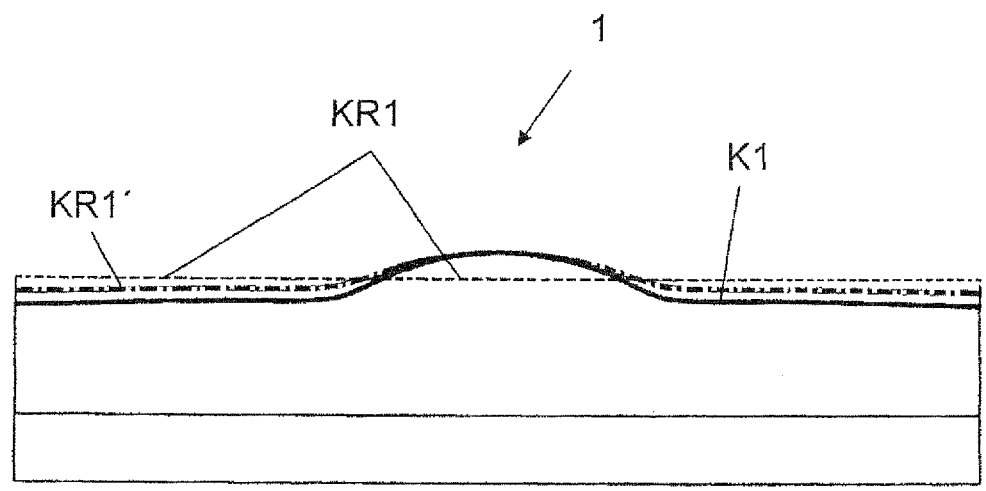
FIG. 9 shows an illustration of the deformation steps carried out from the blank to the finished supporting track element, specifically as seen from the longitudinal side of the supporting track element.

FIG. 9 once again illustrates the contour lines KR1, KR1' and K1 which have already been explained from the longitudinal side of the supporting track element 1.

Figure 10:
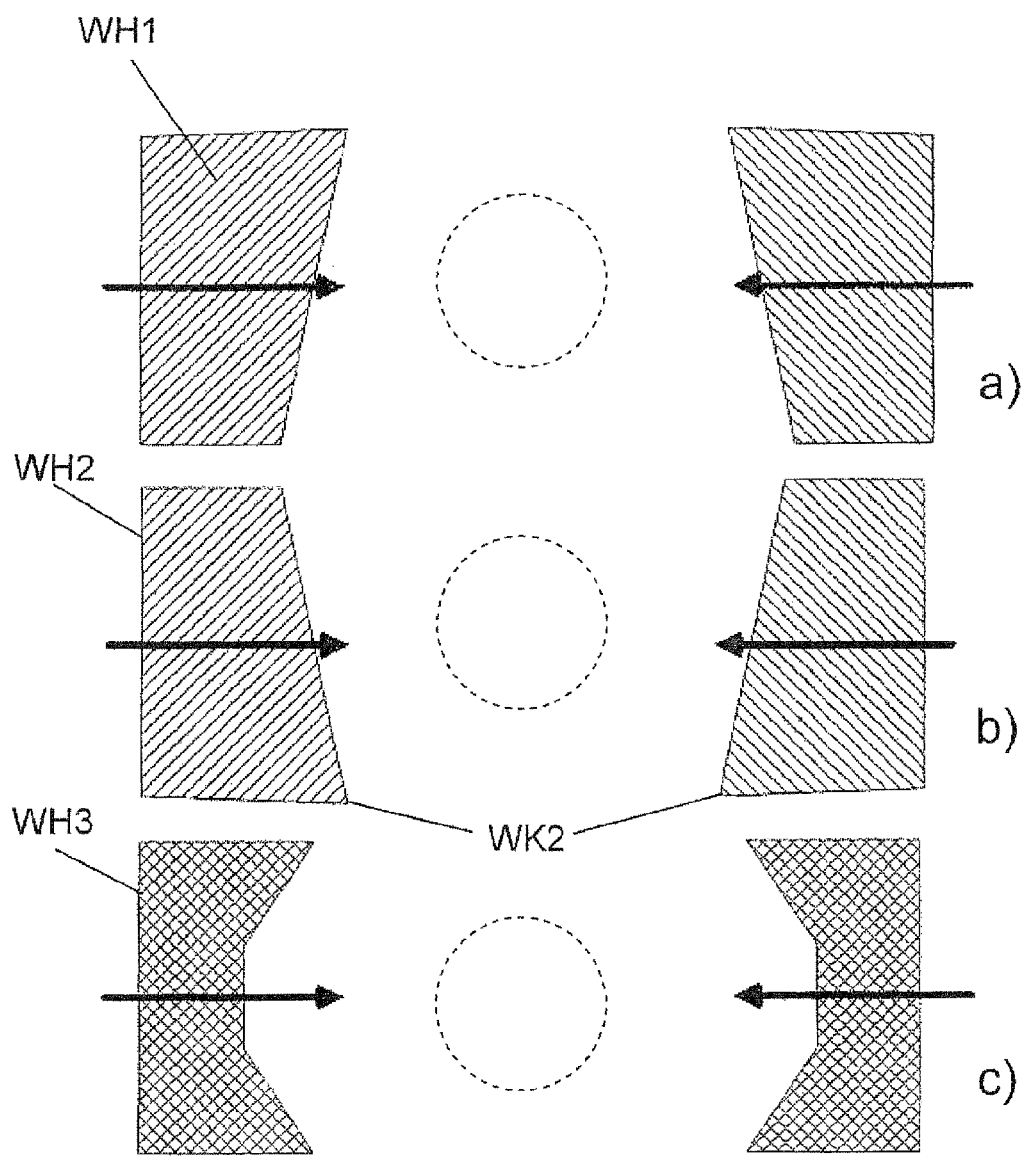
FIGS. 10a, 10b, 10c show schematic illustrations of alternative deformation tools for applying horizontal deformation forces with a workpiece which is merely indicated by dashed lines and schematically.

FIG. 10 shows in highly schematic form possible tools WH1, WH2 and WH3 for applying horizontal deformation forces. In this case, care should be taken to ensure that the bevel of the tool WH1 shown in FIG. 10a corresponds precisely to the contour K1 of the deformed and ready supporting track element 1. Should a degree of deformation obtained in this case not be sufficient, there is also the possibility of obtaining a greater raising of the material in the central region by "pinching", using the edges WK2 level with the base of the material interruption RMU (compare FIG. 10b). As an alternative to this, a tool WH3 which combines the tools WH1 and WH2 may also be provided (compare FIG. 10c). In addition, it could be advantageous, if appropriate, to design the slot-like material interruption RMU to be V-shaped at least in the central region RMB in order to additionally be able to utilize the geometrical effect when pressing together the adjacent cross-sectional regions R10 (increase in the central region).

Figure 11:
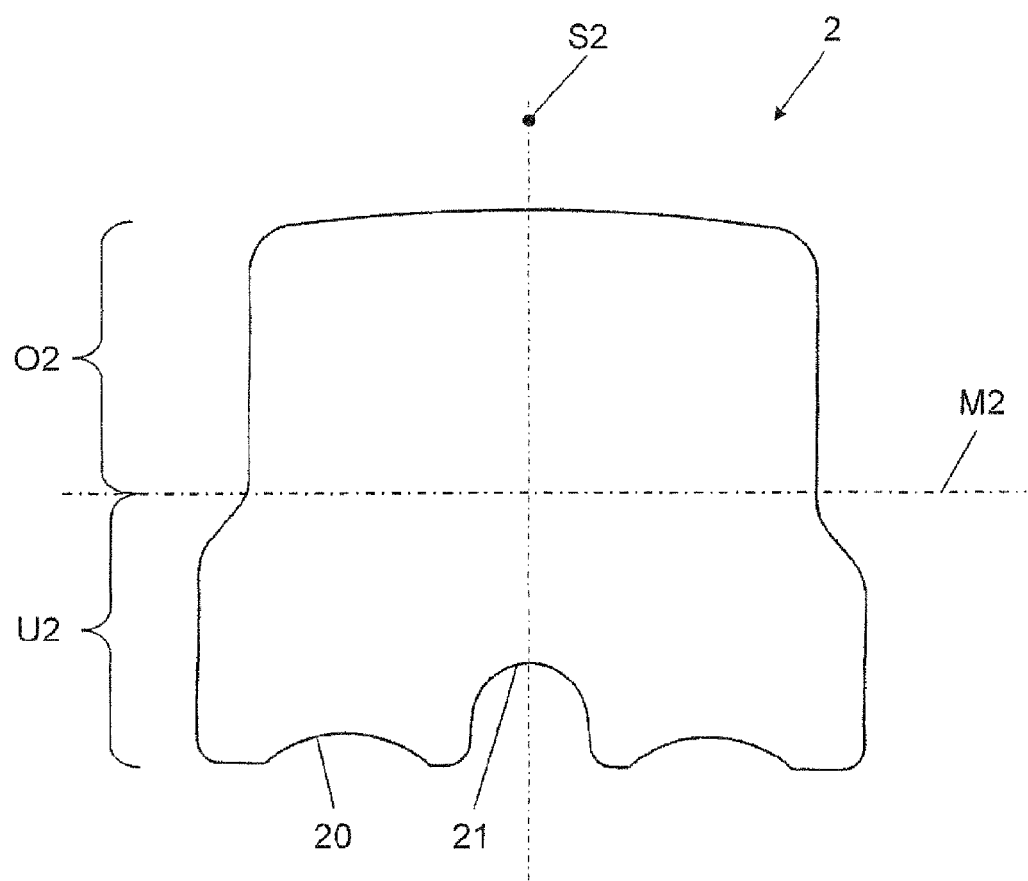
FIG. 11 shows an end side view of a supporting track element according to the prior art.

In order to clarify the difference from the supporting track element 1 according to the invention, FIG. 11 shows a supporting track element 2 according to the prior art, with a cross-sectional line of symmetry S2, a cross-sectional centerline M2, an upper half O2 and a lower half U2, and with tracks 20 which are spaced apart from each other by means of a groove-like depression 21. It is apparent that no material interruption whatsoever is provided in the upper half O2.

Figure 12:
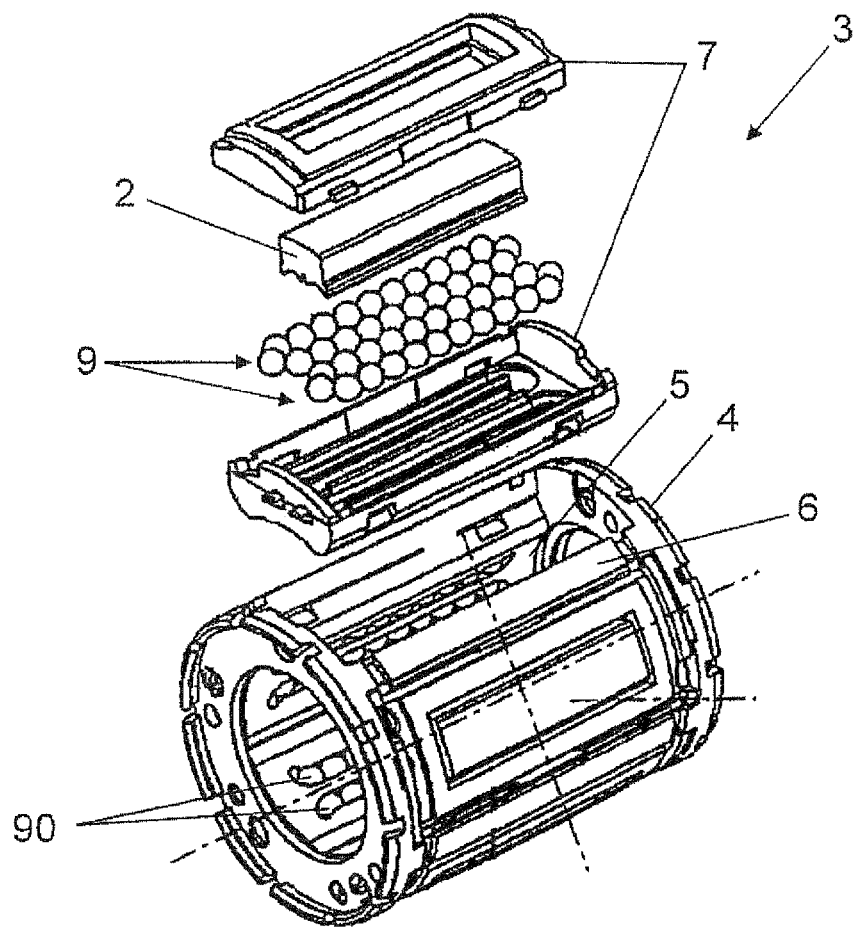
FIG. 12 shows a perspective illustration of a linear ball bearing according to the prior art, in which supporting track elements according to the invention can be used.

Finally, FIG. 12 illustrates a known linear ball bearing 3. The linear ball bearing 3 serves for the axially displaceable mounting of a shaft in a housing inner bore (neither shown). The linear ball bearing 3 has a sleeve-like cage 4 which has recesses 5 spaced apart over its circumference by means of connecting webs 6. The recesses 5 have a rectangular shape in horizontal projection and serve to releasably receive recirculating ball track housings 7. As can be seen, the cage 4 is provided with five recirculating ball track housings 7, wherein each recirculating ball track housing 7 contains two recirculating ball tracks 9. Each recirculating ball track 9 has a supporting section with load-bearing balls 90 supported rollably on the shaft, and furthermore a return section with balls (not illustrated specifically) returning after the supporting section, and two deflecting sections (likewise not illustrated specifically) connecting said sections to each other such that endless recirculating tracks are formed. Each recirculating ball track housing 7 receives a known supporting track element 2. It is apparent that a linear ball bearing 3 of this type could also receive supporting track elements 1 according to the invention, with the already described advantages then arising.

LIST OF DESIGNATIONS

1 Supporting track element
10a Adjacent cross-sectional region of the supporting track element
10b Adjacent cross-sectional region of the supporting track element
100 Outwardly curved outer surface
2 Supporting track element according to the prior art
20 Tracks of the supporting track element according to the prior art
21 Groove-like depression in the supporting track element according to the prior art
3 Linear ball bearing
4 Sleeve-like cage
5 Recesses
6 Connecting webs
7 Recirculating ball track housing
9 Recirculating ball track
90 Load-bearing balls of a recirculating ball track
11 Tracks
12 Groove-like depression
13 Lateral material clearances of the supporting track element
14 Lateral material clearances of the supporting track element
K1 Contour line of the deformed and ready supporting track element
KR1 Contour line of the supporting track element blank
KR1' Contour line of the supporting track element blank after a first deformation
KB Contact region of the adjacent parts of the supporting track element
L Longitudinal extent of the supporting track element
M Cross-sectional centerline of the supporting track element
M2 Cross-sectional centerline of the supporting track element according to the prior art
MB Central region of the supporting track element
MU Material interruption of the supporting track element
O Upper half of the supporting track element
O2 Upper half of the supporting track element according to the prior art
U Lower half of the supporting track element
U2 Lower half of the supporting track element according to the prior art
R1 supporting track element blank
R10a Adjacent cross-sectional region of the supporting track element blank
R10b Adjacent cross-sectional region of the supporting track element blank
R100 Curved outer surface of the supporting track element blank
R11 Tracks of the supporting track element blank
R12 Groove-like depression in the supporting track element blank
R13 Material clearances of the supporting track element blank
R14 Material clearances of the supporting track element blank
RAB Outer regions of the supporting track element blank
RL Longitudinal extent of the supporting track element blank
RM Cross-sectional centerline of the supporting track element blank
RMB Central region of the supporting track element blank
RMU Slot-like material interruption of the supporting track element blank
RO Upper half of the supporting track element blank
RS Cross-sectional line of symmetry of the supporting track element blank
RU Lower half of the supporting track element blank
r1 Radius of the curved surface in the transverse direction of the supporting element
r2 radius of the curved surface in the longitudinal direction of the supporting element S Cross-sectional line of symmetry of the supporting track element
S2 Cross-sectional line of symmetry of the supporting track element according to the prior art
WH1 Tool for machining the supporting track element blank
WH2 Tool for machining the supporting track element blank
WH3 Tool for machining the supporting track element blank
WK2 Edges of the tool WH2
WV Tool for machining the supporting track element blank

The invention claimed is:

1. A supporting track element for use in a linear ball bearing, comprising:
   at least one outer surface which is outwardly curved in one direction, at least in some regions; and
   at least one track which is opposite the at least one outer surface and is intended for at least partially receiving load-bearing balls of a linear ball bearing,
   wherein the supporting track element in cross-section has at least one material interruption by means of which two adjacent cross-sectional regions are formed, the adjacent cross-sectional regions touching at least in some regions, at least in a region of the at least one outer surface.

2. The supporting track element of claim 1, wherein the material interruption is arranged in a region of a cross-sectional line of symmetry of the supporting track element.

3. The supporting track element of claim 1, wherein the adjacent cross-sectional regions touch in a central region of a longitudinal extent of the supporting track element.

4. The supporting track element of claim 1, wherein the supporting track element is provided along longitudinal sides with at least one material clearance, each material clearance being arranged approximately level with the material interruption.

5. The supporting track element of claim 4, wherein the supporting track element has at least one further material clearance along the longitudinal sides.

6. The supporting track element claim 1, wherein the supporting track element has a lower half and an upper half in THE cross-section, and the material interruption is located substantially in a region of the upper half of the supporting track element.

7. A linear ball bearing for the longitudinally displaceable mounting of a wavy guide rail in a part surrounding the guide rail, with a cage having recesses which are arranged one behind another in a circumferential direction and in which recirculating ball tracks are held,
   wherein each of the recirculating ball tracks have at least one supporting section with load-bearing balls supported rollably on the guide rail, and
   wherein the load-bearing balls of the recirculating ball tracks are additionally supported rollably on a track of a supporting track element which is inserted indirectly or directly into the cage and has at least one radial outer surface which is outwardly curved at least in one direction and is intended for contact with an inner surface of the part surrounding the guide rail,
   wherein at least one linear ball bearing is designed as the supporting track element according to claim 1.

8. A method for producing the supporting track element of claim 1, with the following method steps:
   producing a supporting track element blank as an extruded profile, having at least one slot-shaped material interruption extending in a longitudinal direction of the supporting track element blank and as a result of which two adjacent cross-sectional regions having an outer surface are formed, and the slot-shaped material interruption lies opposite a side of the supporting track element blank, which has tracks;
   acting upon the supporting track element blank at least in some regions with horizontal deformation forces in such a manner that the adjacent cross-sectional regions touch at least in some regions; and
   simultaneously or subsequently acting upon the supporting track element blank, at least in some regions, with vertical deformation forces in such a manner that the outer surface of the supporting track element blank assumes a contour which corresponds to the supporting track element.

* * * * *